United States Patent [19]

Arnegger

[11] Patent Number: 4,584,999
[45] Date of Patent: Apr. 29, 1986

[54] SAW BLADE WITH SHALLOW SECTION

[76] Inventor: Richard E. Arnegger, Rietlirain, 8713 Uerikon, Switzerland

[21] Appl. No.: 626,410

[22] Filed: Jun. 29, 1984

Related U.S. Application Data

[63] Continuation-in-part of Ser. No. 394,187, Jul. 1, 1982, abandoned.

[30] Foreign Application Priority Data

Jul. 14, 1981 [CH] Switzerland .................. 4595/81

[51] Int. Cl.⁴ .............................................. A61B 17/14
[52] U.S. Cl. ....................................... 128/317; 30/350; 30/351
[58] Field of Search ............... 128/317; 29/DIG. 16; 156/664; 83/835, 854, 855; 30/351, 350

[56] References Cited

U.S. PATENT DOCUMENTS

| 431,510 | 7/1890 | Douglas | 83/854 |
|---|---|---|---|
| 1,689,618 | 10/1928 | Brown | 83/835 |
| 1,690,803 | 11/1928 | Vander Wee | 83/854 |
| 3,111,970 | 11/1963 | Priest et al. | 83/855 |
| 3,291,667 | 12/1966 | Young, Jr. et al. | 156/664 |
| 3,492,178 | 1/1970 | Westling | 156/664 |
| 3,905,105 | 9/1975 | Tuke | 128/317 |
| 3,905,374 | 9/1975 | Winter | 128/317 |
| 3,952,412 | 4/1976 | Rhodes | 128/317 |
| 4,324,163 | 4/1982 | Lavelle | 83/835 |
| 4,374,869 | 2/1983 | Dorey et al. | 156/664 |
| 4,456,500 | 6/1984 | Ibata | 156/664 |

Primary Examiner—C. Fred Rosenbaum
Assistant Examiner—Gene B. Kartchner

[57] ABSTRACT

The present invention relates to a saw blade in which the teeth of the blade are not set and in which the saw blade on each side face has a shallow section formed by etching which at the location of the teeth extends over a part of the height of the teeth.

2 Claims, 3 Drawing Figures

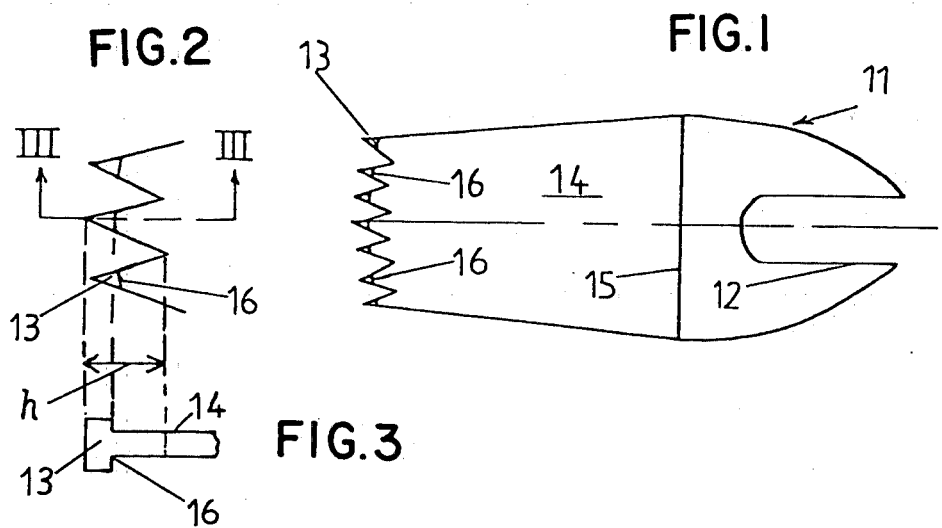

SAW BLADE WITH SHALLOW SECTION

This is a continuation-in-part application of my co-pending U.S. application for patent Ser. No. 06/394,187 filed July 1, 1982, now abandoned.

BACKGROUND OF THE INVENTION

The present invention relates to a saw blade with a row of teeth which are arranged parallel to the side faces of the saw blade.

It is known to set the teeth of a saw blade, which means to bend them alternatingly in opposite directions with reference to the center plane of the blade, which is parallel to its side faces. Thereby it is accomplished that the cut made by the saw is somewhat wider than the thickness of the saw blade. It is known that this is necessary to avoid the saw's jamming and getting excessively hot during the sawing process. The setting of the teeth is a very precise and delicate work.

Circular saws are also known which are provided with cavity facets. Such saw blades are, in the direction away from the teeth, tapered or reduced in thickness, i.e. such blades diminish in thickness in the direction away from the teeth. The reason for such a formation of the blades is to have the saw chips or the sawdust that is not transported away to the side by the movement of the blade, to move in the direction vertical to the row of teeth into the hollow space formed by the cavity facets.

In practice, however, even saw blades with cavity facets oftentimes will not sufficiently transport the saw chips away. This causes a detrimental warming up of the blade. In addition to this, in surgical operations on bones, an undesired compression of bone dust will occur (pasting).

SUMMARY OF THE INVENTION

These disadvantages are to be avoided by the present invention, which is characterized in that the saw blade is provided on each of its side faces with a shallow section formed by etching which, at the location of the teeth, extends outwardly over a part of the height of the teeth.

With the inventive device, a setting of the teeth is superfluous. Additionally, due to the lack of a setting, there results as a further advantage a relatively thin cut. This again has the advantage that less saw chips or sawdust will be produced, which in an industrial utilization will save cutting costs.

The invention also pertains to a method to produce the inventive saw blade, which is characterized in that in an embodiment of a ribbon shaped saw blade, the shallow sections are made by etching.

By using an etching process, the required dimensions of the shallow section may be made very accurately without any undue stress or strain imparted to the saw blade.

BRIEF DESCRIPTION OF THE DRAWINGS

The invention will be described in connection with the following examples and the drawings, in which:

FIG. 1 is a side view of a saw blade for an oscillating saw for surgery in bone operations;

FIG. 2 is an enlarged section of the side view of the three middle teeth of the blade of FIG. 1; and FIG. 3 is a cross-sectional view along the line III—III of FIG. 2 showing the construction of the tip of the teeth.

DESCRIPTION OF THE PREFERRED EMBODIMENTS

The saw blade 11 shown in FIG. 1 may be connected to a driving means (not shown) by slot 12. Thus the slot 12 represents the place of fixture of the saw blade 11 to the driving means. The saw blade has along a part of its edge a row of teeth 13. In FIG. 1 there is shown an upper, visible side face containing a shallow section 14 which extends between a border line 15 near the slot 12 and the border line 16 in the teeth 13. It is seen that, at the location of the teeth 13, the shallow section 14 extends over a part of the height of the teeth, wherein the height of the teeth 12 is shown in FIG. 3 by the distance h, that is, by the distance of the teeth points to the teeth base. In a preferred embodiment, the shallow section 14 extends over approximately two-thirds of the total height "h" of the teeth. Therefore, in FIGS. 1, 2, and 3, the parts of the teeth to the left of the border line 16 are thicker than the parts on the right-hand side of the border line 16; that is, the teeth extend outwardly over a part of the height of the teeth (see FIG. 3).

In FIGS. 1 and 2, on the side face of the saw blade 11, which is not visible and away from the spectator, there is a second shallow section. This section is mirror inverted to the visible section 14 in relation to the center plane, which is parallel to the side surfaces of the saw blade. In other words, the two shallow sections are in registry with each other; while the saw blades known in the art have a teeth setting, the teeth 13 of the inventive saw blade 11 are parallel to the blade faces and thus have no setting.

During sawing, the points of the teeth 13 cut or break away parts from the material to be sawn, which parts by the back and forth movement or (in the case of a circular saw) by the rotating movement of the teeth, are partially moved sideways out of the cutting gap. Especially with small amplitudes, for example in using an oscillating saw in bone surgery, only a small part of the saw chips are thereby moved away and the chips not removed must escape from the teeth points 13 into the shallow section 14 toward the inner part of the saw blade 11, see FIGS. 1, 2, and 3 to the right-hand side. Such an escape takes place very easily in the use of the inventive saw blade 11 because a relatively large gap is present between the teeth points, and because a lot of free space exists due to the shallow sections 14. In the example of FIG. 1, this free space extends from the line 16 near the teeth points onto the border line 15.

Thus, there is produced a small saw blade made from an etchable material with a row of teeth for use in surgical operations on bones, wherein the saw blade is of plate-shaped form and is provided for an oscillating movement around a pivot, with the teeth formed for cutting in both directions of the oscillating movement of the blade. Also, the row of teeth is arranged along a part of the edge of the saw blade and the teeth are disposed parallel to the side faces of the blade, the teeth being shaped in such a manner, that each side face of the teeth has the shape of an isosceles triangle, having the bisecting line of the angle between the equal sides extending from the edge of the tooth toward the pivot of the oscillating movement of the blade, the side faces of the blade being parallel to each other, and each being provided with a shallow section extending up to the location of the teeth and extending over at least two-thirds of the height of the teeth, said shallow sections being in registry with and parallel to each other and formed without introducing stress in the blade. This is accomplished by etching.

In operation of the saw blade 14, the chips or sawdust can easily escape in the direction away from the teeth toward the inner side (in the drawing to the right-hand side) of the blade 14. The saw blade 14 is heating up very little during operation and cutting takes place with a minimum of pressure upon the saw. A relatively thin cut is achieved at relatively low cutting costs. Finally, there is no need for the expensive procedure of setting teeth.

The method of forming the small saw blade with a row of teeth adaptable for surgical operations on bones, wherein the saw blade is of plate-shaped form and is adaptable to oscillating movement, is produced by forming said teeth for cutting in both directions of the blade subject to oscillating movement, arranging said row of teeth along a part of the edge of the saw blade disposed parallel to the side faces of the blade, said side faces being parallel to each other, and providing each of said side faces with a shallow section extending up to the location of the teeth and extending over at least two-thirds of the height of the teeth, and forming the said shallow sections by etching with the shallow sections being in registry with and parallel to each other.

The closest art known to the applicant is in the disclosure of the prior art cited by the Examiner in parent application Ser. No. 06/394,184: U.S. Pat. Nos. 431,510 to Douglas; 1,690,803 to Vander Wee; 3,111,970 to Priest et al; and 3,905,374 to Winter.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A method of forming a saw blade with a row of teeth for surgical operations on bones, wherein said teeth are of a height which extends between the cutting edge and the base of the teeth, the saw blade is of plate-shaped form made of etchable material and having two side faces, and is built to perform an oscillating movement, the method comprising the steps of forming said teeth for cutting in both directions of the blade subject to oscillating movement, arranging said row of teeth along a part of the edge of the saw blade with the teeth disposed parallel to the side faces of the blade, i.e. being unset, and providing by etching each of said side faces to form a shallow recessed section extending up to the location of the teeth and extending over at least two-thirds of the height of the teeth, with the shallow sections being in registry with and parallel to each other.

2. A saw blade of longitudinal form with a row of teeth for use in surgical operations on bones, wherein the saw blade is of plate-shaped form, having two side faces, and is provided for an oscillating movement around a pivot by a driving means pivotable around said pivot, with the teeth formed for cutting in both directions of the oscillating movement of the blade, as formed by the method of claim 1.

* * * * *